W. S. HOLLAND.
TRACTOR WHEEL.
APPLICATION FILED MAR. 12, 1921.

1,402,611.

Patented Jan. 3, 1922.
3 SHEETS—SHEET 1.

W. S. Holland,
INVENTOR

BY Victor J. Evans
ATTORNEY

WITNESS:

W. S. HOLLAND.
TRACTOR WHEEL.
APPLICATION FILED MAR. 12, 1921.
1,402,611.
Patented Jan. 3, 1922.
3 SHEETS—SHEET 2.
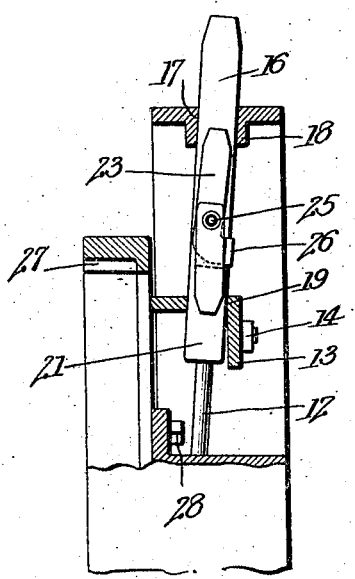
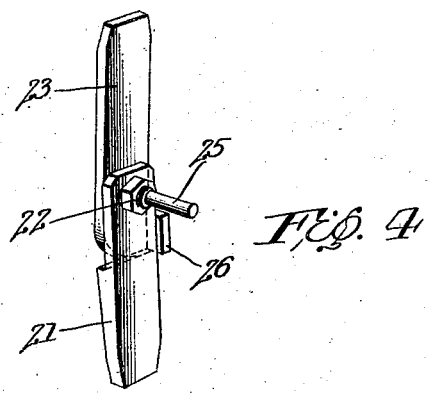
W. S. Holland,
INVENTOR
BY Victor J. Evans
ATTORNEY
WITNESS:

FIG. 5.
FIG. 6.
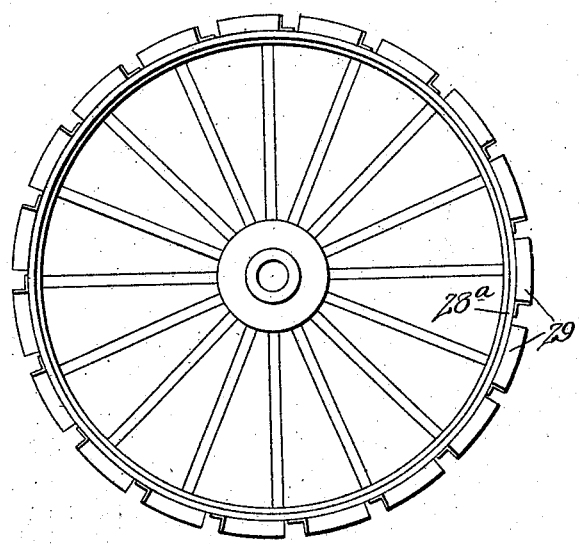
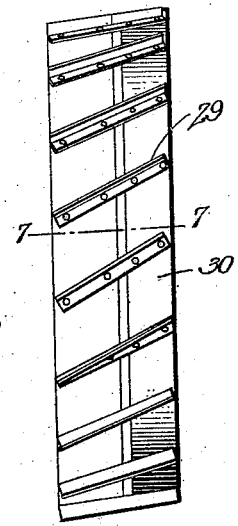
FIG. 7.
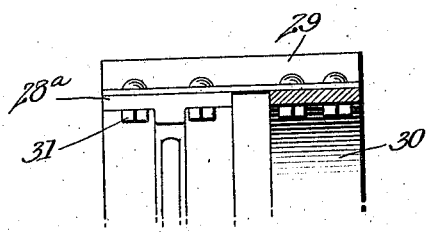

UNITED STATES PATENT OFFICE.

WILLIAM S. HOLLAND, OF ARRINGTON, VIRGINIA.

TRACTOR WHEEL.

1,402,611.  Specification of Letters Patent.  Patented Jan. 3, 1922.

Application filed March 12, 1921. Serial No. 451,717.

*To all whom it may concern:*

Be it known that I, WILLIAM S. HOLLAND, a citizen of the United States, residing at Arrington, in the county of Nelson and State of Virginia, have invented new and useful Improvements in Tractor Wheels, of which the following is a specification.

This invention relates to improvements in tractor wheels and has for an object the provision of a wheel having a number of radially extending tractor elements, which are capable of adjustment to regulate their depth of engagement with the ground, whereby a firm grip may be obtained in soft or muddy surfaces, or the said elements may be retracted for travel over hard roads.

Another object of the invention is the provision of means whereby these tractor elements may be easily and quickly adjusted and held in position against accidental movement.

A further object is the provision of means whereby the width of the tread of the wheel may be increased to increase its traction qualities.

With the above and other objects in view, the invention further includes the following novel features and details of construction, to be hereinafter more fully described, illustrated in the accompanying drawings and pointed out in the appended claims.

In the drawings:—

Figure 2 is a section on the line 2—2 of Figure 1.

Figure 3 is a detail perspective view of one of the traction elements.

Figure 4 is a similar view of the means for locking the traction elements in position.

Figure 5 is a side view of a modified form of traction wheel.

Figure 6 is an elevation at right angles to Figure 5.

Figure 7 is a sectional detail view on the line 7—7 of Figure 6.

Figure 1:
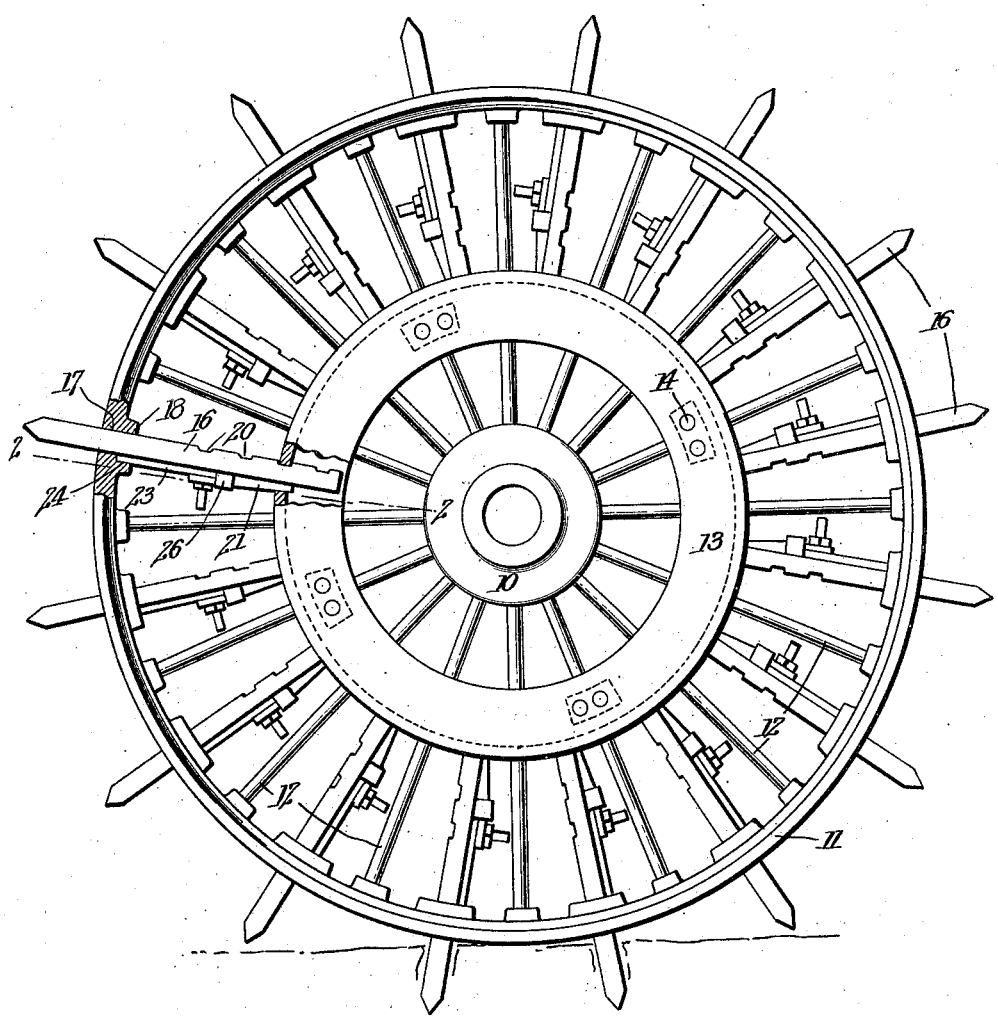
Figure 1 is a side elevation of a traction wheel constructed in accordance with the invention, parts being broken away.

Referring in detail to the drawings and especially to Figures 1 to 4 inclusive, the invention is shown as applied to a wheel which includes a hub 10, a rim 11 and spokes 12, the construction of which may be varied as desired.

The invention consists in providing a plurality of radially adjustable traction elements which are carried by the wheel and for this purpose there is employed an annulus 13, which is preferably L-shaped in cross section as shown in Figure 2 and which is securely bolted to the spokes 12, as indicated at 14. This annulus forms a guide for the inner ends of the traction elements, indicated at 16. These elements extend through openings 17 provided in the rim 11, the said openings being preferably surrounded by a flange 18 so as to obtain a greater bearing surface. The inner ends of the traction elements 16 extend through openings 19 provided in the annulus 13 and the said elements are formed with a plurality of spaced notches 20 for engagement with one edge of the openings 19. By this means the traction elements may be arranged to extend a desired distance beyond the outer periphery of the rim 11, the distance being controlled by the particular notch 20 which engages the annulus.

In order to hold the traction elements in position, there is provided a locking device, one of which is provided for each of the elements 16. These locking devices each include a wedge 21 which enters the opening 19 so as to force the walls of the notch over the adjacent edge of the said opening. Eccentrically pivoted to the wedge 21 as shown at 22, is one end of an arm 23, the opposite end of which enters a socket 24 which is provided in the rim 11 and which communicates with the opening 17 through which the outer end of the traction element extends. In order to insert the locking devices in position, the outer end of the arms 23 are inserted in the sockets 24 and the outer end of the wedges 21 inserted in the openings 19 with the said arms and wedges arranged at an angle. The locking devices are then moved upon their pivot 22 so as to bring the arms and wedges into relative alignment, whereupon they will be forced into their proper positions. In order to facilitate the operation of these locking devices, the pivot 22 is extended so as to provide an operating handle 25, while a right angularly extending lug 26 is carried by each of the arms 23 to act as a stop and limit the pivotal movement of the device in one direction.

As illustrated in Figure 2, an integral gear 27 may be secured to the wheel as shown at 28 so as to provide means for connection with the propelling power of a tractor or other machine to which the wheel is applied.

The invention is susceptible of various changes in its form, proportions and minor details of construction and the right is herein reserved to make such changes as properly fall within the scope of the appended claims.

Having described the invention what is claimed is:—

1. The combination with a wheel, of an annulus carried by the wheel and positioned between the hub and rim thereof, radially adjustable traction elements engageable with the annulus and extending through openings provided in the rim and means engageable with the rim and annulus for adjustably securing the traction elements in position.

2. The combination with a wheel, of an annulus carried by the wheel and positioned between the hub and rim thereof, radially adjustable traction elements engageable with the annulus and extending through openings provided in the rim and means including pivotally mounted wedges engageable with the rim and annulus for adjustably securing the traction elements in position.

3. The combination with a wheel, of an annulus carried by the wheel and positioned between the hub and rim thereof, radially adjustable traction elements engageable with the annulus and extending through openings provided in the rim and eccentric locking devices engageable with the rim and annulus for adjustably securing the traction elements in position.

4. The combination with a wheel, of an annulus carried by the wheel and positioned between the hub and rim thereof, radially adjustable traction elements engageable with the annulus and extending through openings provided in the rim and locking devices, each comprising a wedge engageable with the traction elements and the annulus and an arm eccentrically pivoted to the wedge and engaging the traction element and rim for adjustably securing the said elements in position.

5. The combination with a wheel, of an annulus secured to the wheel and positioned between the hub and rim thereof, radially adjustable traction elements having spaced notches engageable with the annulus and extending through the rim and means engageable with the rim and annulus for adjustably securing the traction elements in position.

In testimony whereof I affix my signature.

WILLIAM S. HOLLAND.